United States Patent
Hiki

(10) Patent No.: US 7,731,673 B2
(45) Date of Patent: Jun. 8, 2010

(54) WALKING ASSISTING DEVICE

(75) Inventor: Yutaka Hiki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 11/814,637

(22) PCT Filed: May 29, 2006

(86) PCT No.: PCT/JP2006/310657

§ 371 (c)(1),
(2), (4) Date: Jul. 24, 2007

(87) PCT Pub. No.: WO2006/126710

PCT Pub. Date: Nov. 30, 2006

(65) Prior Publication Data

US 2009/0199883 A1    Aug. 13, 2009

(30) Foreign Application Priority Data

May 27, 2005  (JP)  .............................. 2005-155329
Jul. 19, 2005  (JP)  .............................. 2005-208278

(51) Int. Cl.
*A61F 5/00* (2006.01)
(52) U.S. Cl. .............................. 602/16; 602/23; 602/27
(58) Field of Classification Search ................ 602/16, 602/19, 23–24, 26–27; 482/51
See application file for complete search history.

(56) References Cited

U.S. PATENT DOCUMENTS 4,872,665 A * 10/1989 Chareire ..................... 482/51
5,230,700 A    7/1993 Humbert et al.
5,658,242 A *  8/1997 McKay et al. ................ 602/16
7,524,297 B2 * 4/2009 Shimada et al. .............. 602/16

FOREIGN PATENT DOCUMENTS

| DE | 29 21 227    | 12/1980 |
|----|--------------|---------|
| DE | 44 08 351    | 9/1994  |
| FR | 2 262 957    | 10/1975 |
| JP | 05-329186    | 12/1993 |
| JP | 07-112035    | 5/1995  |
| JP | 2003-220102  | 8/2003  |
| JP | 2004-236998  | 8/2004  |
| JP | 2005-169052  | 6/2005  |

* cited by examiner

*Primary Examiner*—Michael A. Brown
(74) *Attorney, Agent, or Firm*—Rankin, Hill & Clark LLP

(57) ABSTRACT

A compact and easy-to-use walking assisting device capable of reducing constrained feeling given to a user and allowing a free swing of the arms of the user in walking. The walking assisting device comprises one or more leg links to which ground contact members are connected at their lower ends respectively and a load transfer portion connected to the upper ends of the leg links, in which at least a part of the weight of the user is supported by the leg links via the load transfer portion, wherein the load transfer portion includes a seat member for the user to sit astride, wherein connecting portions with the upper ends of the leg links connected thereto are attached to the undersurface of the seat member, and wherein the connecting portions have a degree of freedom allowing the forward/backward and lateral swings of the leg links.

18 Claims, 9 Drawing Sheets

WALKING ASSISTING DEVICE

BACKGROUND OF THE INVENTION

The present invention relates to a walking assisting device for assisting walking by reducing load on user's legs.

Conventionally, as this type of walking assisting device, there is known one including a pair of left and right leg links connected to ground contact members attached to the user's left and right feet at their lower ends respectively and a load transfer portion connected to the upper ends of the leg links, wherein at least a part of the user's weight is supported by the leg links via the load transfer portion to reduce load on the user's legs so as to assist the user in walking (for example, refer to Japanese Patent Laid-Open No. 2003-220102). In this structure, the load transfer portion includes a waist support belt attached around the user's waist with the left and right leg links connected to the load transfer portion via first joints corresponding to human hip joints on both sides of the waist support belt in the lateral direction. The leg links are each formed of a freely bending and stretching link having a second joint corresponding to a human knee joint midway in the vertical direction. Moreover, a driving source for the second joint is provided to generate an assist force for supporting a part of the user's weight by means of a rotational drive of the second joint caused by the driving source.

In the conventional embodiment, however, there is a need for the user to wear the waist support belt tightly around the waist in order to transmit the assist force to the user's body reliably, and therefore the user easily has constrained feeling. Furthermore, the first joints of the left and right leg links project on both sides of the user's waist, and therefore the user easily hits his hands against the first joints or the upper parts of the leg links connected to the first joints when swinging his arms in walking, thereby reducing usability.

Furthermore, there is conventionally known a walking assisting device wherein a frame enclosing a user from the back to both sides in the lateral direction is provided with four leg links attached vertically and having wheels at lower ends and a saddle-shaped seat member which the user sits astride is mounted on the frame and wherein, after detecting a force that the user applies to the seat member, the wheels are driven so that the force becomes equal to a predetermined target value (for example, refer to Japanese Patent No. 3156367).

In this conventional embodiment, however, the device is large in size and cannot be used in a small place though the user's constrained feeling can be reduced. In addition, the user easily hits his hands against the frame when swinging his arms in walking, by which good usability is not provided.

SUMMARY OF THE INVENTION

The present invention has been provided in view of the above background. Therefore, it is an object of the present invention to provide a compact and easy-to-use walking assisting device capable of reducing constrained feeling given to a user and allowing a free swing of the arms of the user in walking.

In order to achieve the above object, according to the present invention, there is provided a walking assisting device comprising one or more leg links to which ground contact members are connected at their lower ends respectively and a load transfer portion connected to the upper ends of the leg links, in which at least a part of the weight of a user is supported by the leg links via the load transfer portion, having the following means. Specifically, in a first aspect of the present invention, the load transfer portion includes a seat member for the user to sit astride, there are provided connecting portions for connecting the upper ends of the leg links to the seat member, and the connecting portions are arranged in such a way as to be located within a lateral width between the left and right femoral heads of the user when the user is in a sitting position on the seat member. In a second aspect of the present invention, the load transfer portion includes a seat member for the user to sit astride, and connecting portions with the upper ends of the leg links connected thereto are attached to the undersurface of the seat member.

According to the present invention, the supporting force of the leg links can be reliably transmitted from the crotch to the body of the user via the seat member. Furthermore, the user only needs to sit astride the seat member, thereby reducing constrained feeling given to the user. In addition, according to the first aspect of the present invention, the supporting force of the leg links is applied to the seat member between the user's left and right femoral heads, by which the stability of the seat member is secured. Furthermore, according to the second aspect of the present invention, the connecting portion is attached to the undersurface of the seat member. Accordingly, the connecting portions and the upper parts of the leg links connected thereto are located under the crotch of the user, and therefore the user does not hit his hands against the connecting portions or the upper parts of the leg links when swinging his arms in walking, by which the user can swing his arms freely. Moreover, the device is compact in size unlike the conventional one having a frame enclosing the user. Therefore, it can be used in a small place, by which the usability is remarkably improved in addition to the reduction in constrained feeling and the secured free arm swing.

It is also possible to connect a single self-supporting leg link, which is arranged on a ground contact member in the form of a small-sized bogie having a plurality of wheels, to the connecting portion on the undersurface of the seat member and to drive the wheels in concert with user's walking. To assist the user in walking reliably, however, it is preferable to provide at least a pair of left and right leg links, wherein the ground contact members connected to the lower ends of the left and right leg links are attached to the user's left and right feet respectively and wherein the left and right leg links can swing in the forward/backward direction in concert with the forward/backward movement of the left and right legs of the user in walking. In this case, if the connecting portions are adapted to allow only the forward/backward swing of the left and right leg links, the user cannot abduct his left and right legs. On the other hand, if the connecting portions have a degree of freedom allowing the forward/backward and lateral swings of the left and right leg links, the user can abduct his legs, which increases the degree of freedom in leg movement.

When the lateral swings of the left and right leg links are allowed as described above, however, the following defects will occur. Specifically, in a one-leg supporting state, the seat member is affected by a rolling moment around the lateral swing fulcrum of the leg link on the side of a supporting leg (a leg with the foot on the floor) due to the weight of the leg link on the side of an idling leg (a leg with the foot off the floor), which causes the rolling of the seat member. To resolve the above defect, the connecting portions on the undersurface of the seat member are preferably formed in such a way that the lateral swing fulcrum of one of the left and right leg links and the lateral swing fulcrum of the other leg link are located on the same axis line in forward and backward direction. According thereto, even if the weight of the leg link on the side of the idling leg is applied to the seat member in the one-leg supporting state, the seat member is not affected by the rolling moment around the lateral swing fulcrum of the leg link on the side of the supporting leg since the lateral swing fulcrum of the leg link on the side of the idling leg which is a weight-applied portion is located on the same axis line as the lateral swing fulcrum of the leg link on the side of the supporting leg. Therefore, it is possible to prevent the rolling of the seat member in the one-leg supporting state.

Where the ground contact member to which each foot of the user is attached is connected to each leg link at the lower end via the joint, the line of action of the supporting force of the leg link matches the line between the joint and the connecting portion. If the lateral distance between the joint and the connecting portion gets longer, the lateral component of the supporting force increases, which thereby increases the lateral force applied to the ground contact member and the seat member and makes the ground contact member and the seat member unstable. In this case, by disposing the joint laterally inside of the center of the width of the ground contact member, the lateral distance between the joint and the connecting portion is reduced, which decreases the lateral force acting on the ground contact member and the seat member and secures the stability.

If the leg link has a middle joint moving in such a way as to change a distance between the ground contact member and the seat member, the leg link can follow the change in distance between the foot and the crotch caused by bending and stretching of the knee joint of each user's leg. In this instance, it is possible to generate a force for supporting the user's weight by providing biasing means for biasing the joint in the middle of the leg link in the stretching direction (in the direction of increasing the distance between the ground contact member and the seat member). It is, however, preferable to provide a driving source for driving the joint in the middle of the leg link. This generates a supporting force depending on a load imposed on the user's foot by the control of the driving source so as to assist the user in walking appropriately.

When the driving source is provided as described above, the driving source attached to the joint in the middle of the leg link increases the moment of inertia of the leg link around the connecting portion on the undersurface of the seat member, by which the user's leg feels heavy in walking due to the moment of inertia of the leg link applied to the leg. If the driving source is arranged at the end on the side of the connecting portion of the leg link to cope with the above problem, the moment of inertia of the leg link around the connecting portion can be reduced advantageously.

Furthermore, preferably the seat member has a constricted portion, which is narrower in width than the backside and the foreside, in the forward/backward middle of the seat member, with the foreside curved upward. In this instance, the user sits on the seat member with the left and right legs positioned laterally on both sides of the constricted portion. According thereto, the wide backside and foreside prevent the seat member from being misaligned relative to the user in the forward/backward direction and the upward curved foreside avoids the leg swinging forward from hitting against the foreside in walking, thereby securing the degree of freedom in leg movement in walking. Furthermore, the weight relief assist force can be reliably transmitted to the user by means of the contact with the ischial bones in the wider backside of the seat member.

Moreover, if the foreside of the seat member is formed in a fork shape with a lateral middle portion cut away, the crotch or the like does not abut the foreside of the seat member and therefore the seat member becomes comfortable to sit on. Furthermore, both sides of the foreside in the lateral direction easily flex in the lateral direction. Therefore, even if the forward swinging leg abuts the foreside, the flexion of the foreside absorbs the abutment force and the seat member can be thereby prevented from yawing due to the abutment of the leg.

DESCRIPTION OF REFERENCES

1 . . . seat member; 2L, 2R . . . leg link; 3 . . . first joint (connecting portion on the undersurface of the seat member); 37 . . . stopper member; 5 . . . second joint (joint in the middle of the leg link); 7 . . . third joint (joint in the lower end of the leg link); 8 . . . ground contact member; 9 . . . driving source.

DETAILED DESCRIPTION OF THE INVENTION

Figure 1:
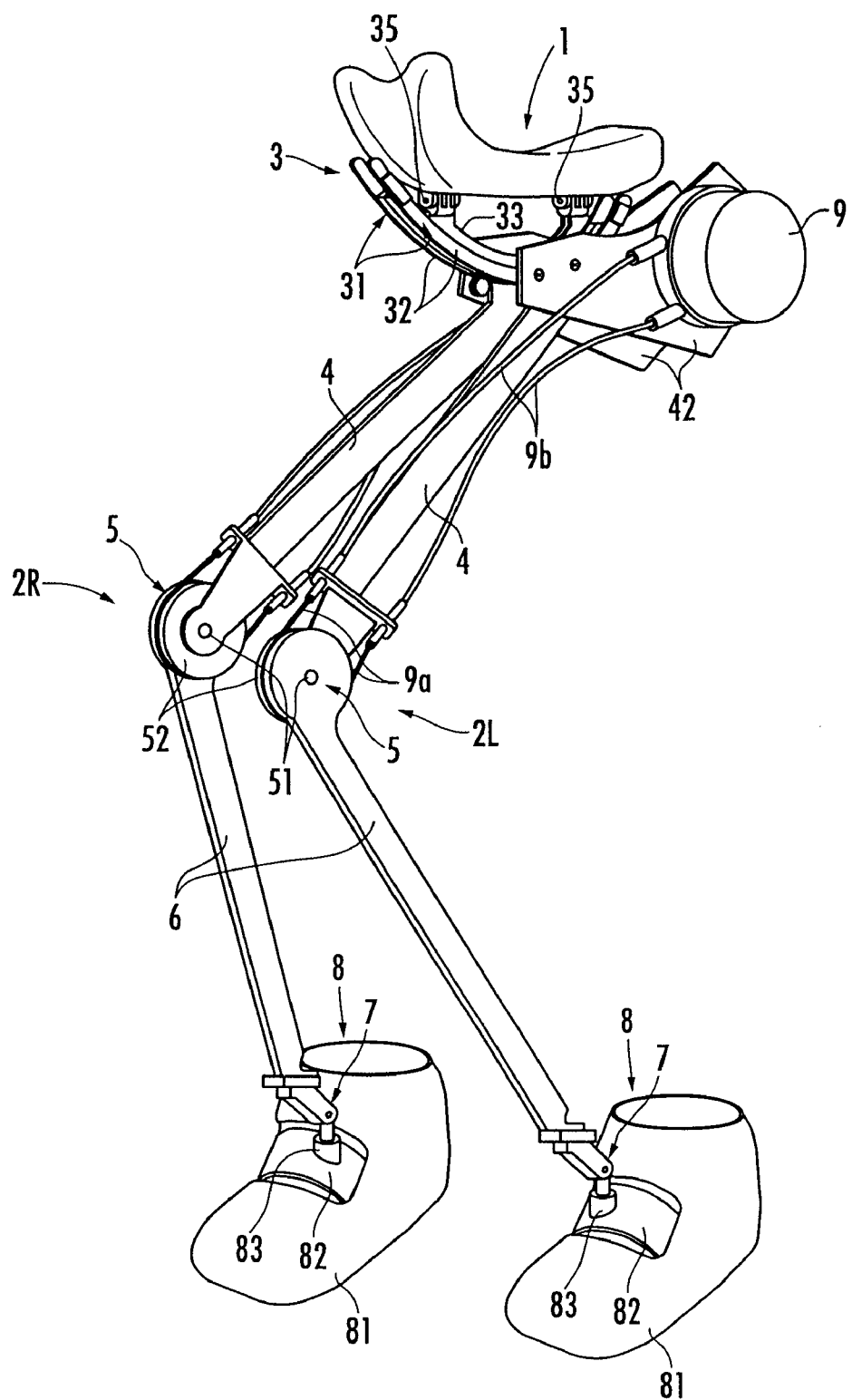
FIG. 1 is a perspective diagram of a walking assisting device according to a first embodiment of the present invention.
Figure 2:
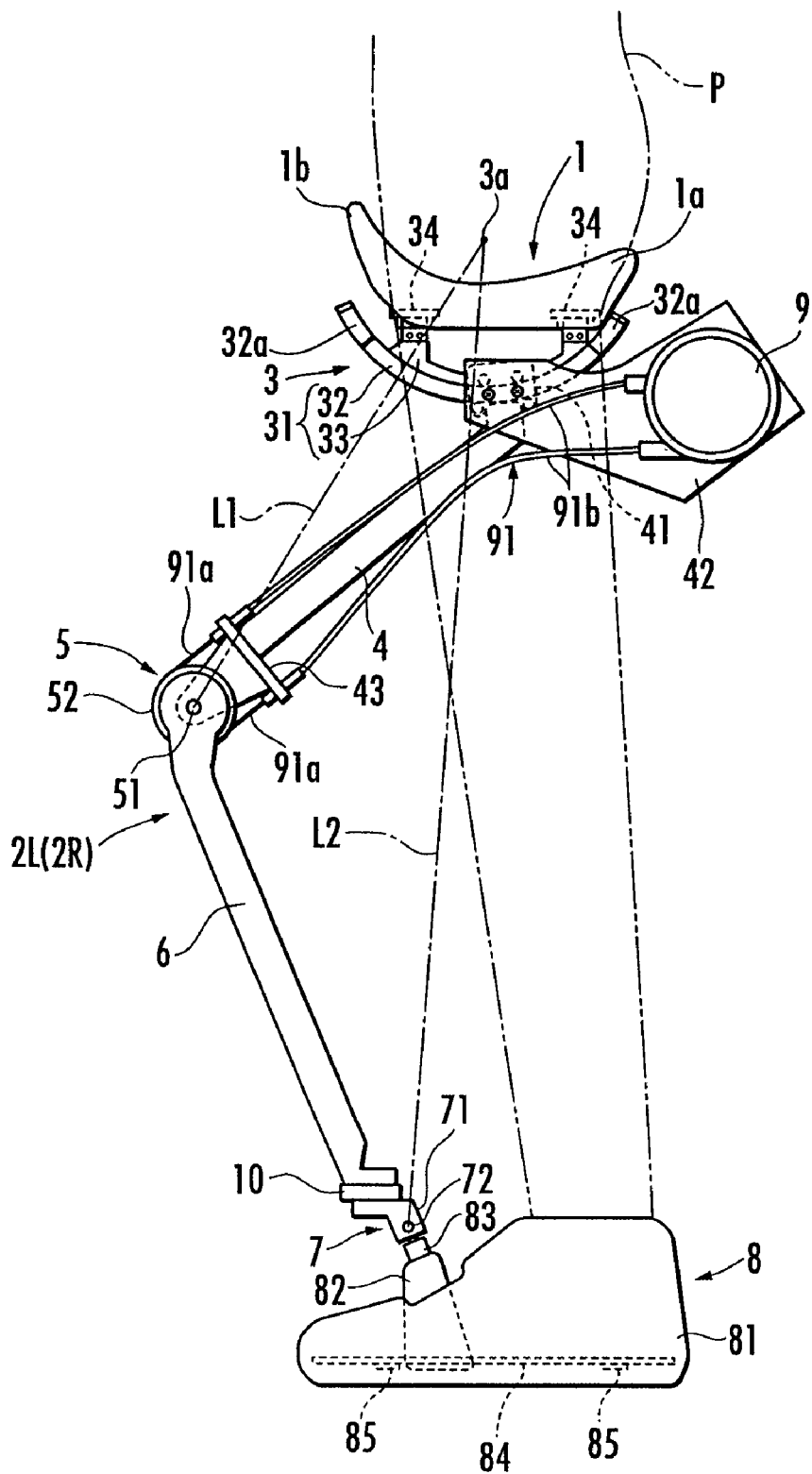
FIG. 2 is a side view of the walking assisting device according to the first embodiment.
Figure 3:
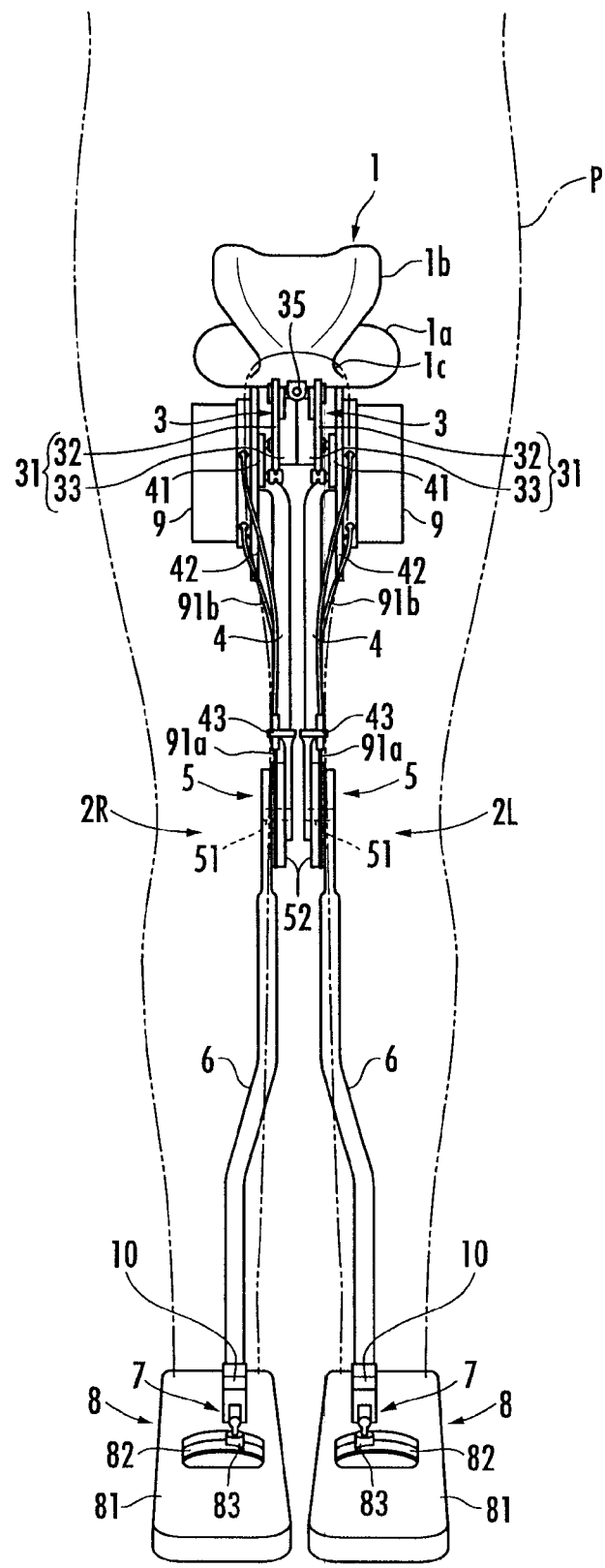
FIG. 3 is a front view of the walking assisting device according to the first embodiment.

A walking assisting device according to preferred embodiments of the present invention will be described hereinafter. As shown in FIG. 1 to FIG. 3, the walking assisting device includes a seat member 1 serving as a load transfer portion which a user P sits astride and a pair of left and right leg links 2L and 2R arranged under the seat member 1.

The leg links 2L and 2R are each composed of a freely bending and stretching link, which has a first link 4 connected to a first joint 3 serving as a connecting portion attached to the undersurface of the seat member 1 and a second link 6 connected to the lower end of the first link 4 via a rotary second joint 5. Furthermore, the lower end of the second link 6 is connected to a ground contact member 8 attached to a user's left or right foot via a third joint 7. The leg links 2L and 2R are each equipped with a driving source 9 for the second joint 5. A rotational drive of the second joint 5 caused by the driving source 9 applies a force in the stretching direction of increasing the distance between the ground contact member 8 and the seat member 1 to each of the leg links 2L and 2R so as to generate a supporting force for supporting at least a part of the user's weight (hereinafter, referred to as a weight relief assist force). The weight relief assist force generated in each of the leg links 2L and 2R is transmitted to the body of the user P via the seat member 1 and the load on the leg of the user P is thereby reduced.

Furthermore, the first joint 3 is located within a lateral width between the user's left and right femoral heads when the user sits astride the seat member 1. Therefore, the weight relief assist force acts on the seat member 1 between the user's left and right femoral heads, by which the weight relief assist force is reliably transmitted to the user's body and the stability of the seat member 1 is secured. Although not shown, a power supply and controller for the driving source 9 are housed in a backpack carried on the user's back.

The user P can use the walking assisting device according to this embodiment only by wearing the ground contact members 8 on his feet and sitting on the seat member 1, without having a constrained feeling almost at all. In addition, the first joints 3 and the first links 4 of the leg links 2L and 2R are located under the crotch of the user P and therefore the user P does not hit his hands against the first joints 3 and the first links 4 when swinging his arms in walking, by which the user P can swing his arms freely. Moreover, the device is compact in size and therefore it can be used in a small place, by which the usability is remarkably improved in addition to the reduction in constrained feeling and the secured free arm swing.

Figure 4:
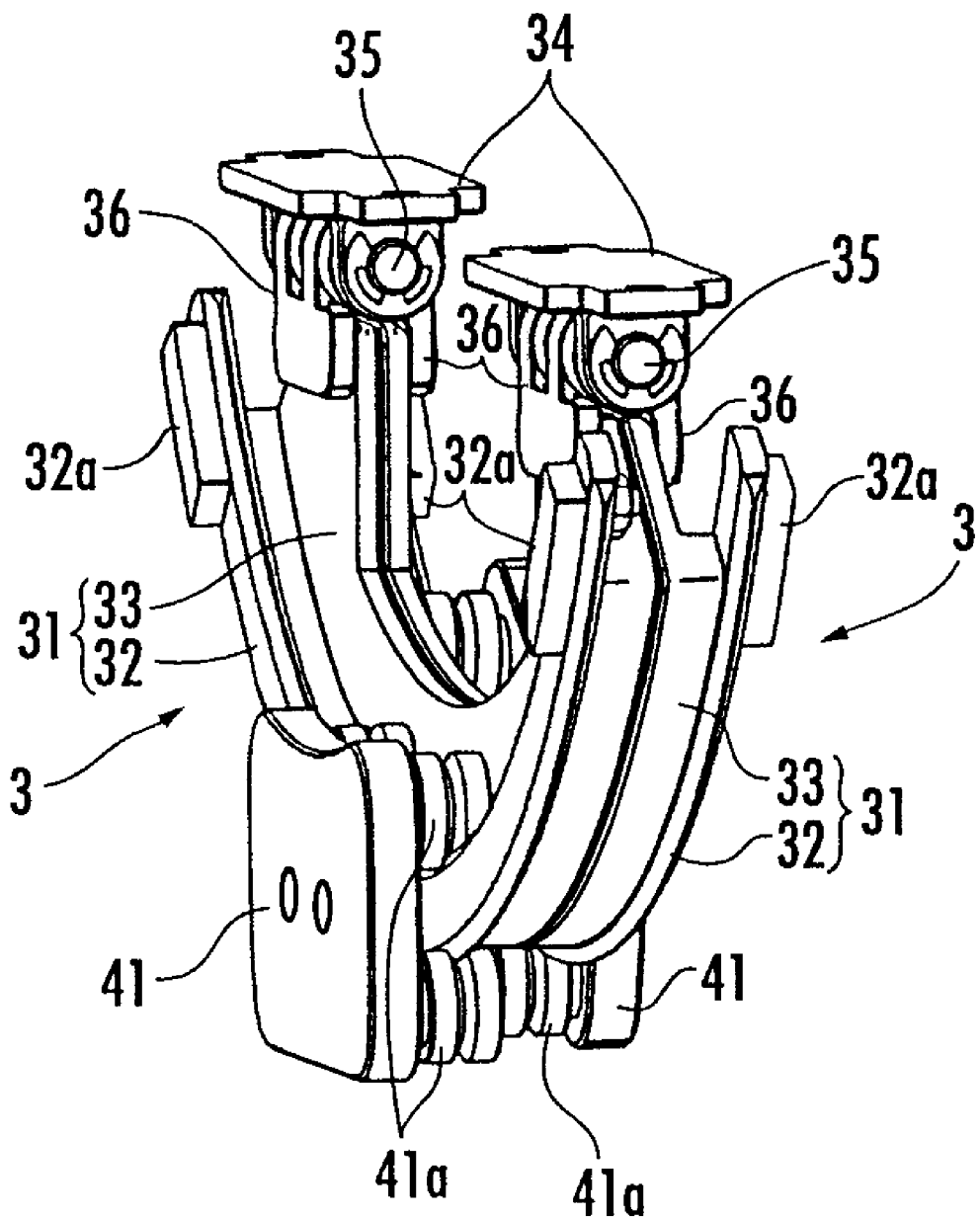
FIG. 4 is a fragmentary perspective diagram of first joints of the walking assisting device according to the first embodiment.
Figure 5:
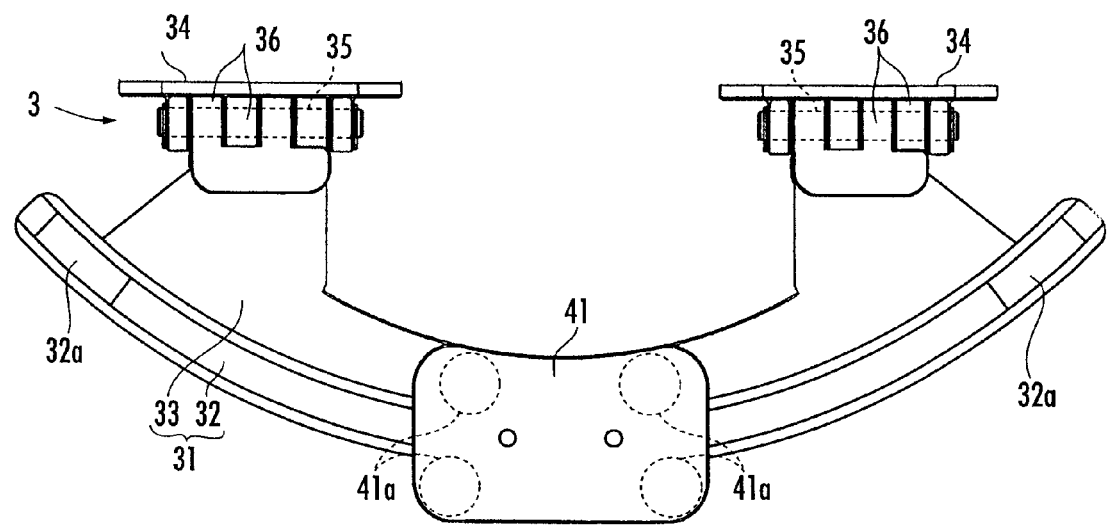
FIG. 5 is a fragmentary side view of the first joint of the walking assisting device according to the first embodiment.

The first joints 3 for the leg links 2L and 2R are each composed of a joint member 31 including an arc-shaped guide track 32 longitudinal in the forward/backward direction and a support plate 33 for supporting the guide track 32 as clearly shown in FIG. 4 and FIG. 5. While the guide track 32 is composed of an arc-shaped rail in this embodiment, it can also be composed of an arc-shaped groove formed in the support plate 33. At the upper end of the first link 4 of each of the leg links 2L and 2R, there is provided a slider 41 having vertical pairs of rollers 41a with the guide track 32 vertically interposed therebetween from both sides, so that the slider 41 movably engages with the guide track 32 via the rollers 41a. In this way, the leg links 2L and 2R swing in the forward/backward direction around the center of curvature of the guide track 32 and the forward/backward swing fulcrum of the leg links 2L and 2R functions as the center of curvature of the guide track 32.

As shown in FIG. 2, the center of curvature of the guide track 32, namely the forward/backward swing fulcrum 3a of each of the leg links 2L and 2R in each first joint 3 is located above the seat member 1. If the user P bends his upper body forward or the like at this moment and thereby the action point of the weight of the upper body of the user P relative to the seat member 1 is misaligned forward of the forward/backward swing fulcrum 3a of each of the leg links 2L and 2R, the seat member 1 inclines forward and downward. If the seat member 1 continues to incline further, it is misaligned backward relative to the user P. In this embodiment, however, the action point of the weight is displaced backward under the swing fulcrum 3a together with the forward and downward inclination of the seat member 1 and thereby the forward/backward distance between the fulcrum 3a and the action point of the weight decreases, which thereby decreases the angular moment applied to the seat member 1. Thereafter, the angular moment applied to the seat member 1 becomes zero when the action point of the weight is displaced up to the position just under the swing fulcrum 3a, which stabilizes the seat member 1 in this state. Since the seat member 1 automatically converges on the stable state in this way, it is possible to prevent the seat member 1 from being misaligned in the forward/backward direction under the crotch of the user P.

In addition, the slider 41, which is the upper end of each of the leg links 2L and 2R, engages with a part of the guide track 32, which is located backward of a line L1 between the second joint 5 of each of the leg links 2L and 2R and the forward/backward swing fulcrum 3a (the center of curvature of the guide track 32) of each of the leg links 2L and 2R. This secures a forward swing stroke of each of the leg links 2L and 2R that follows the forward swing motion of the leg of the user P without a need for the guide track 32 being particularly long in the forward direction. In addition, a stopper 32a is attached to each of the forward and backward ends of the guide track 32 in order to prevent the first links 4 from being uncoupled.

Furthermore, the joint members 31, each of which is a component of the first joint 3 for each of the left and right leg links 2L and 2R, are pivotally supported so as to be free to swing in the lateral direction by forward/backward spindles 35 and 35, which are supported by a pair of front and back support blocks 34 and 34 attached to the lateral center of the undersurface of the seat member 1, in hinge members 36 and 36 attached to the upper front and back ends of the support plate 33. Therefore, the first joints 3 have a degree of freedom allowing the lateral swing of the leg links 2L and 2R in addition to the degree of freedom allowing the forward/backward swing of the leg links 2L and 2R, by which the user P can swing his legs outward.

Figure 8:
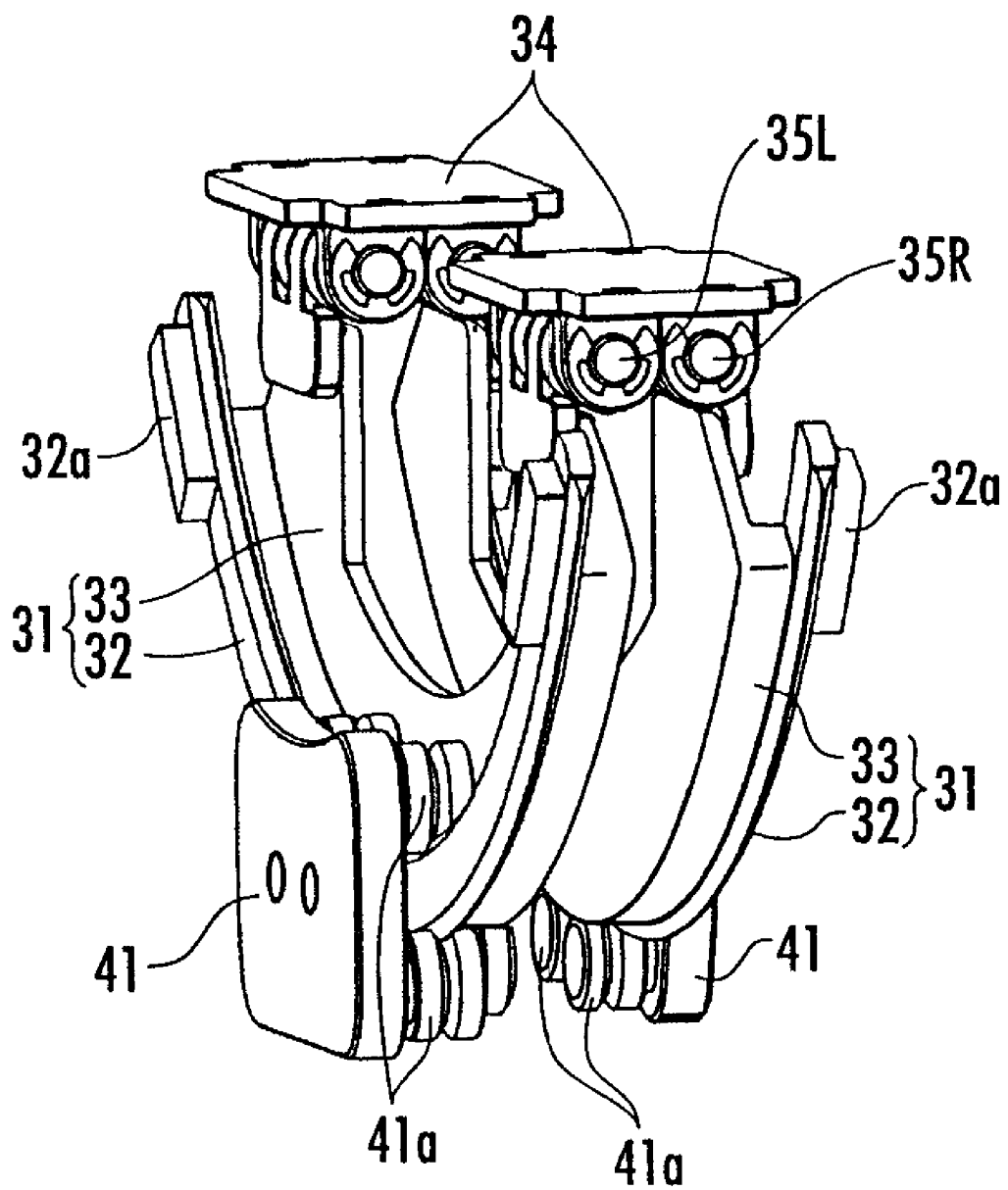
FIG. 8 is a perspective diagram of first joints according to a second embodiment.

Furthermore, the joint member 31 for the left leg link 2L and the joint member 31 for the right leg link 2R are pivotally supported by the common spindles 35. In other words, the lateral swing fulcrum of the left leg link 2L and the lateral swing fulcrum of the right leg link 2R are located on the same forward/backward axis line. Although it is also possible to pivotally support the joint member 31 for the left leg link 2L and the joint member 31 for the right leg link 2R by separate spindles 35L and 35R laterally arranged in parallel with each other as in a second embodiment shown in FIG. 8, the arrangement causes the following defect.

Specifically, in a one-leg supporting state, the weight (or an assist force if the assist force is generated to assist in lifting the idling leg by applying a force to the leg link in the direction of bending it as described later) of the leg link on the side of an idling leg (a leg with the foot off the floor) is applied to the seat member 1 via the lateral swing fulcrum of the leg link. If the lateral swing fulcrum (the spindle 35L) of the left leg link 2L is separated from the lateral swing fulcrum (the spindle 35R) of the right leg link 2R as in the second embodiment, the seat member 1 is affected by a rolling moment around the lateral swing fulcrum of the leg link on the side of a supporting leg (a leg with the foot on the floor) due to the weight of the leg link on the side of the idling leg in the one-leg supporting state, which causes the rolling of the seat member 1.

On the other hand, the lateral swing fulcrum of the leg link on the side of the idling leg, to which the weight of the leg link on the side of the idling leg is applied, is located on the same axis line (the spindles 35) as for the lateral swing fulcrum of the leg link on the side of the supporting leg in the one-leg supporting state in this embodiment. Therefore, the seat member 1 is not affected by the rolling moment around the lateral swing fulcrum of the leg link on the side of the supporting leg. Accordingly, it is possible to prevent the rolling of the seat member 1 in the one-leg supporting state. The weight of the leg link on the side of the idling leg is transmitted to the floor via the leg link on the side of the supporting leg, and the seat member 1 is not affected by the weight of the leg link on the side of the idling leg.

Moreover, the leg links 2L and 2R are each formed in such a length that the leg link is bent with the second joint 5 projecting forward of a reference line L2 even if the user P is standing upright, where the reference line L2 (see FIG. 2) is a line connecting the forward/backward swing fulcrum 3a of each of the leg links 2L and 2R in the first joint 3 to the third joint 7. In addition, the height of the seat member 1 can be automatically adjusted to fit the user P with the control of the driving source 9. Therefore, there is no need to manufacture a dedicated device for an individual or to adjust the lengths of the leg links, thereby achieving a versatile walking assisting device and lowering costs.

In the upright state of the user P, the reference line L2 is almost vertical at this moment and almost all parts of each of the leg links 2L and 2R including the second joint 5 are located forward of the third joint 7. Therefore, if the driving source 9 is placed coaxially with the second joint 5, the weight of each of the leg links 2L and 2R including the driving source 9 generates a large swing moment in a forward tilting direction around the third joint 7 in each of the leg links 2L and 2R when the user P is standing upright. Thereby, the swing moment causes a forward push force to act on the seat member 1. Furthermore, when the user P swings his leg forward, a backward swing moment occurs around the forward/backward swing fulcrum 3a in the first joint 3 in each of the leg links 2L and 2R, thereby giving a resistance to the forward swing of the leg. If the driving source 9 is placed coaxially with the second joint 5, the moment of inertia of each of the leg links 2L and 2R around the first joint 3 increases, by which the legs of the user P feel heavy in walking due to the moments of inertia of the leg links 2L and 2R applied to the legs.

Therefore, in this embodiment, there is attached an overhanging portion 42 made of a board member projecting backward, which is opposite to the second joint 5 in the forward/backward direction relative to the reference line L2, to the slider 41 at the end of each of the leg links 2L and 2R on the side of the first joint 3, namely at the upper end of the first link 4, and there is mounted a driving source 9 on the overhanging portion 42. Thereby, when the user P is standing upright, the reverse swing moment generated by the weight of the driving source 9 diminishes the swing moment in the forward tilting direction around the third joint 7 generated in each of the leg links 2L and 2R by the weight of each of the leg links 2L and 2R excluding the driving source 9. More specifically, the driving source 9 functions as a counterweight to reduce the entire swing moment of each of the leg links 2L and 2R including the driving source 9. In consequence, the forward push force applied to the seat member 1 diminishes, too, and thereby the stability can be secured.

Furthermore, when the user P swings his leg forward, the forward swing moment occurs around the forward/backward swing fulcrum 3a due to the weight of the driving source 9 and this moment assists the leg in swinging forward. Therefore, it is possible to eliminate the resistance to the forward swing of the leg, which is a problem when the leg links 2L and 2R are bent with the second joints 5 projecting forward of the reference line L2. Additionally the distance between the driving source 9 as a heavy load and the swing fulcrum 3a decreases, thereby diminishing the moments of inertia of the leg links 2L and 2R around the first joints 3. Therefore, it is possible to prevent the legs of the user P from feeling heavy in walking due to the moments of inertia of the leg links 2L and 2R applied to the legs.

The driving force generated by the driving source 9 is transmitted to the second joint 5 via driving force transmission means 91. As the driving force transmission means 91, it is possible to use a parallel linkage with a link connected in parallel to the first link 4 or a hydraulic transmission mechanism with a hydraulic cylinder in a portion apart from the second joint 5 of the second link 6. In this embodiment, however, the driving force transmission means 91 is composed of a wire transmission mechanism with a wire 91a between the second joint 5 and the driving source 9 for a reduction in weight and cost.

The details thereof are as described below. More specifically, two wires 91a are led out from the driving source 9: one wire 91a is paid out from the driving source 9, while the other wire 91a is drawn into the driving source 9. The driving source 9 includes an electric motor and a drive pulley for the wire 91a driven by the motor. The wires 91a and 91a are passed through two guide tubes 91b and 91b, respectively, provided between a flange 43 formed in the vicinity of the second joint 5 of the first link 4 and the driving source 9. Additionally, a pulley 52 coaxial with a shaft 51 of the second joint 5 is fixed to the second link 6, the two wires 91a and 91a are wound around the pulley 52 in the direction reverse to each other, and the ends of the wires 91a and 91a are fixed to the pulley 52. In this way, the pulley 52 is rotated by paying out and drawing the wires 91a and 91a from and into the driving source 9, and the rotation causes the second link 6 to swing around the shaft 51 of the second joint 5 relative to the first link 4, thereby bending and stretching the leg links 2L and 2R. Although not shown, an arc-shaped groove is formed on the side surface of the pulley 52 and a protruding portion engaging with the groove is formed in the first link 4 in order to limit the swing stroke of the second link 6 relative to the first link 4 to a given range.

Figure 6:
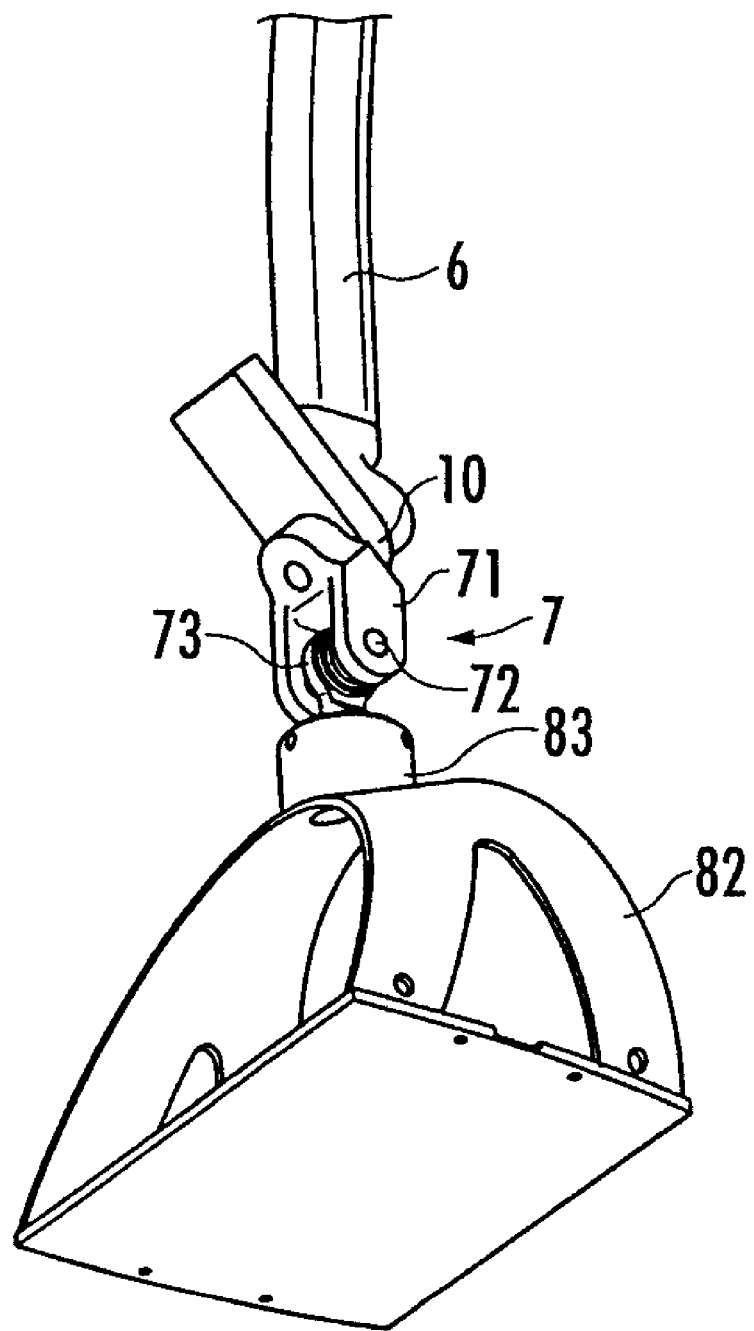
FIG. 6 is a perspective diagram of a lower end of a leg link of the walking assisting device according to the first embodiment.

As shown in FIG. 6, the third joint 7 includes a free joint composed of a yoke 71 connected to the lower end of the second link 6 via a 2-axis force sensor 10 and a moving element 73 connected to a shaft 72 laterally provided at the lower end of the yoke 71 rotatably and free to tilt axially. The weight relief assist force described above acts on the reference line L2 connecting the forward/backward swing fulcrum 3a of the leg links 2L and 2R in the first joint 3 to the third joint 7, when viewed from the lateral perspective. An actual weight relief assist force (to be exact, a resultant force between the weight relief assist force and the force generated by the weights of the seat member 1 and the leg links 2L and 2R) acting on the reference line L2 is calculated based on a detected value of the force in the 2-axis direction detected by the force sensor 10.

The ground contact member 8 includes a shoe 81 and a highly rigid armor coupled ring 82 shown in FIG. 6, which is embedded in the shoe 81. A collar 83 is arranged in a standing condition on the upper surface of the coupled ring 82 and the collar 83 is connected to the lower end of the moving element 73 of the third joint 7. Furthermore, as shown in FIG. 2, an elastic plate 84 to be an insole of the shoe 81 is put on the backside of the coupled ring 82. On the undersurface of the elastic plate 84, there are mounted a pair of front and back pressure sensors 85 and 85 for detecting loads on the metacarpophalangeal joint (MP joint) and the heel of the user's foot.

To control each of the leg links 2R and 2L, the ratio of the load imposed on each foot to the total load on the user's feet is calculated based on the detected values of the pressure sensors 85 and 85 in each of the ground contact member 8. Subsequently, a control target value for a weight relief assist force that should be generated in each leg link is calculated by multiplying a preset value of the weight relief assist force by the ratio of the load on each foot. Thereafter, the driving source 9 is controlled in such a way that an actual weight relief assist force calculated based on the detected value of the force sensor 10 is consistent with the control target value. In the one-leg supporting state, the weight relief assist force of the preset value is generated only with the leg link on the side of the supporting leg. In this instance, the driving of the driving source 9 of the leg link on the side of the idling leg is stopped to allow the second joint 5 to be freely rotated. It is also possible to apply a force in the bending direction to the leg link on the side of the idling leg by means of the driving source to assist the foot of the idling leg in lifting.

The weight relief assist force acts on the line connecting the spindle 35 as the lateral swing fulcrum of the first joint 3 to the third joint 7, when viewed from the front. Therefore, a long lateral distance between the spindle 35 and the third joint 7 increases a lateral component of the weight relief assist force and thus increases a lateral force applied to the ground contact member 8 and the seat member 1. Therefore, in this embodiment, as shown in FIG. 3, the collar 83 on the upper surface of the coupled ring 82 is arranged laterally inside so that the third joint 7 is located laterally inside of the center of the width of the ground contact member 8. According thereto, the lateral distance between the spindle 35 and the third joint 7 decreases and a smaller lateral force acts on the ground contact member 8 and the seat member 1, thereby improving the stability of the ground contact member 8 and the seat member 1.

Figure 7A:
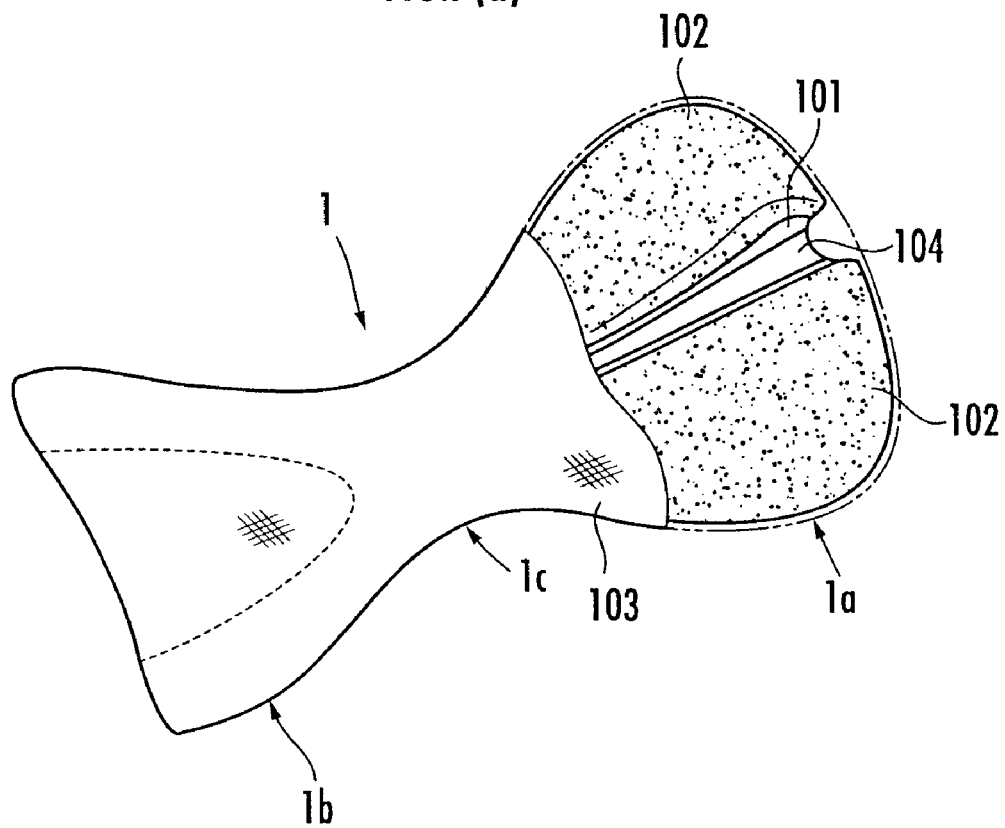
FIG. 7($a$) is a perspective diagram of a seat member of the walking assisting device according to the first embodiment and FIG. 7($b$) is a perspective diagram of a core of the seat member.
Figure 7B:
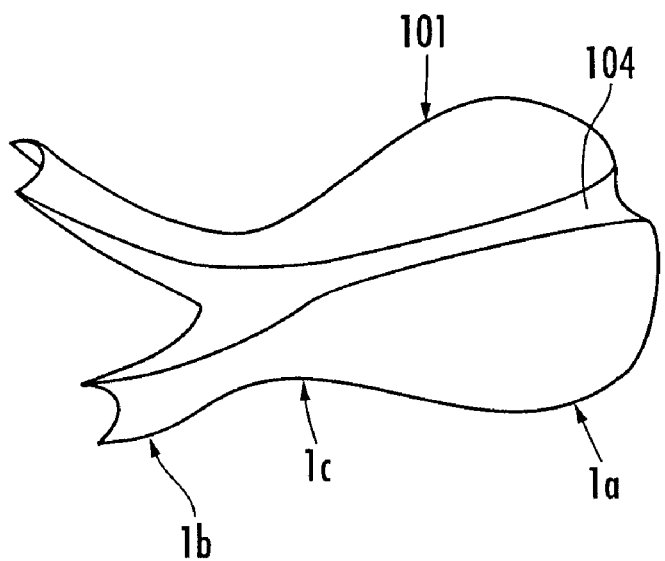

While various kinds of things have been done to stabilize the seat member 1 as described above, some thought is also put into the seat member 1 itself in this embodiment. The thought will be described in detail hereinafter. The seat member 1 as shown in FIG. 7(*a*) is formed into a shape having a constricted portion 1*c*, which is narrower in width than the backside 1*a* and the foreside 1*b*, in the forward/backward middle of the seat member 1. The foreside 1*b* is curved upward (See FIG. 2) and is formed in a fork shape with a lateral middle portion cut away. The user sits on the seat member 1 with his left and right legs positioned laterally on both sides of the constricted portion 1*c*. According thereto, the wide backside 1*a* and foreside 1*b* prevent the seat member 1 from being misaligned relative to the user in the forward/backward direction and the upward curved foreside 1*b* avoids the leg swinging forward from hitting against the foreside 1*b* in walking, thereby securing the degree of freedom in leg movement in walking. Furthermore, the foreside 1*b* formed in the fork shape facilitates the foreside 1*b* to flex laterally. Therefore, even if the forward swinging leg abuts the foreside 1*b*, the flexion of the foreside 1*b* absorbs the abutment force and the seat member 1 can be thereby prevented from yawing due to the abutment of the leg. In addition, the user's crotch or the like does not abut the foreside 1*b* and therefore the seat member 1 becomes comfortable to sit on. The backside 1*a* has enough width to receive the user's left and right ischial bones. Accordingly, the weight relief assist force can be reliably transmitted to the user by means of the contact with the ischial bones.

The seat member 1 includes a core 101 formed of a carbon fiber or the like, a cushioning material 102 put on the upper surface of the core 101, and a cover 103 which covers the core 101 and the cushion material 102. The core 101 has a concave portion 104 in the laterally middle of the core 101 extending in the forward/backward direction as shown in FIG. 7(*b*), with the cushion material 102 put on both sides of the concave portion 104. In addition, the wall thickness of the outer edge of the core 101 is made thin, so that the abutment forces of the legs from the sides can be flexibly absorbed.

Figure 9:
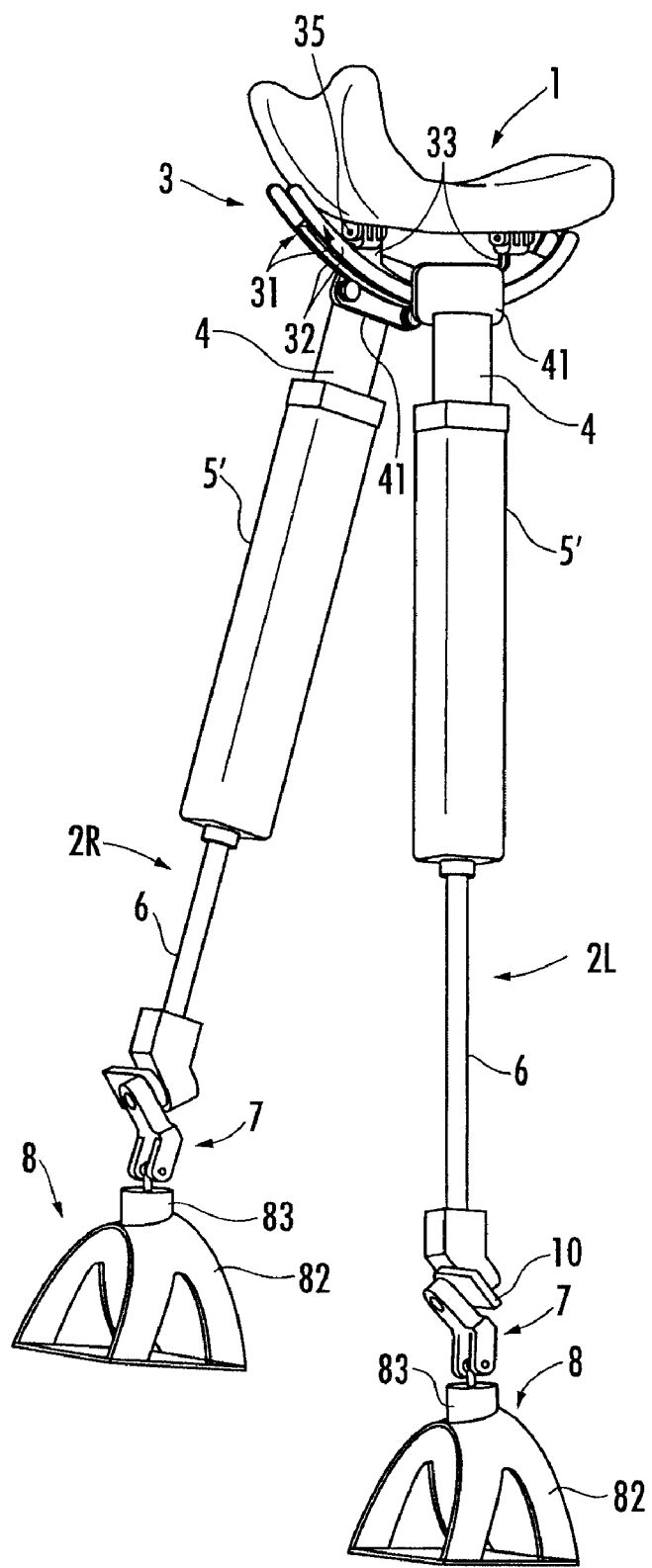
FIG. 9 is a perspective diagram of a walking assisting device according to a third embodiment.

Although the rotary second joint 5 is provided in the middle of each of the left and right leg links 2L and 2R in the first embodiment, it is also possible to provide a direct-acting second joint 5' in the middle of each of the left and right leg links 2L and 2R as in a third embodiment shown in FIG. 9. The second joint 5' includes a driving source composed of an electric motor and a feed screw mechanism, which are not shown. The operation of the driving source causes the second link 6 of each of the leg links 2L and 2R to move linearly via the feed screw mechanism, thereby changing the distance between the ground contact member 8 and the seat member 1.

Although the preferred embodiments of the present invention have been described hereinabove with reference to attached drawings, the present invention is not limited to the above embodiments. For example, it is possible to connect a single self-supporting leg link, which is arranged on a ground contact member in the form of a small-sized bogie having a plurality of wheels, to the connecting portion on the undersurface of the seat member and to drive the wheels in concert with user's walking. Furthermore, to assist a user who is handicapped in one leg due to a fracture of the leg in walking, it is also possible to leave only the leg link on the side of the user's handicapped leg of the left and right leg links 2L and 2R in the above embodiment, while omitting the other leg link. In addition, it is possible to mount the driving source for the second joint 5 or 5', which is located midway in each of the leg links 2L and 2R, on a bracket attached to the rear of the seat member 1, instead of mounting it on each of the leg links 2L and 2R. Furthermore, it is also possible to provide biasing means for biasing the second joint 5 or 5' in the stretching direction (in the direction of increasing the distance between the ground contact member 8 and the seat member 1) without using the driving source.

The invention claimed is:

1. A walking assisting device comprising:
   one or more leg links;
   a ground contact member connected at a lower end of the one or more leg links; and
   a load transfer portion connected to an upper end of the one or more leg links, such that at least a part of the weight of a user is supported by the one or more leg links via the load transfer portion, the load transfer portion including a seat member for the user to sit astride; and
   connecting portions for connecting the upper end of the one or more leg links to the seat member, the connecting portions including a guide track operatively attached to the undersurface of the seat member,
   wherein a slider is operatively attached to the upper end of the one or more leg links,
   wherein the slider movably engages the guide track to facilitate a swinging movement of the one or more leg links in a forward and backward direction, and
   wherein the connecting portions are arranged in such a way as to be located within a lateral width between left and right femoral heads of the user when the user is in a sitting position on the seat member.

2. The walking assisting device according to claim 1, wherein the one or more leg links are provided as at least a pair of left and right leg links, wherein the ground contact members connected to the lower ends of the left and right leg links are attached to a user's left and right feet respectively, and wherein the connecting portions have a degree of freedom allowing forward, backward, and lateral swings of the left and right leg links.

3. The walking assisting device according to claim 2, wherein the connecting portions are formed in such a way that a lateral swing fulcrum of one of the left and right leg links and the lateral swing fulcrum of the other leg link are located on a same axis line in a forward and backward direction.

4. The walking assisting device according to claim 2, wherein the ground contact member is connected to the one or more leg links at the lower end via a joint and the joint is located laterally inside of a center of the width of the ground contact member.

5. The walking assisting device according to claim 1, wherein the one or more leg links includes a middle joint moving in such a way as to change a distance between the ground contact member and the seat member and has a driving source for driving the joint.

6. The walking assisting device according to claim 5, wherein the driving source is arranged at an end on a side of the connecting portion of the one or more leg links.

7. The walking assisting device according to claim 1, wherein the seat member has a constricted portion, which is narrower in width than a backside and a foreside, in a middle of the seat member in a forward and backward direction, with the foreside curved upward.

8. The walking assisting device according to claim 7, wherein the foreside of the seat member is formed in a fork shape with a lateral middle portion cut away.

9. The walking assisting device according to claim 1, wherein the guide track is arc-shaped, wherein the slider includes rollers, and wherein the rollers engage the guide such that the slider rolls along the guide track to facilitate the swinging movement of the one or more leg links in the forward and backward direction.

10. A walking assisting device comprising:
one or more leg links;
a ground contact member connected at a lower end of the one or more leg links; and
a load transfer portion connected to an upper end of the one or more leg links, such that at least a part of a weight of a user is supported by the one or more leg links via the load transfer portion, the load transfer portion including a seat member for the user to sit astride; and
connecting portions, including a guide track, operatively attached to an undersurface of the seat member,
wherein a slider is operatively attached to the upper end of the one or more leg links, and
wherein the slider movably engages the guide track to facilitate a swinging movement of the one or more leg links in a forward and backward direction.

11. The walking assisting device according to claim 10, wherein the one or more leg links are provided as at least a pair of left and right leg links, wherein the ground contact members connected to the lower ends of the left and right leg links are attached to a user's left and right feet respectively, and wherein the connecting portions have a degree of freedom allowing forward, backward, and lateral swings of the left and right leg links.

12. The walking assisting device according to claim 11, wherein the connecting portions are formed in such a way that a lateral swing fulcrum of one of the left and right leg links and the lateral swing fulcrum of the other leg link are located on a same axis line in a forward and backward direction.

13. The walking assisting device according to claim 11, wherein the ground contact member is connected to the one or more leg links at the lower end via a joint and the joint is located laterally inside of a center of the width of the ground contact member.

14. The walking assisting device according to claim 10, wherein the one or more leg links includes a middle joint moving in such a way as to change a distance between the ground contact member and the seat member and has a driving source for driving the joint.

15. The walking assisting device according to claim 14, wherein the driving source is arranged at an end on a side of the connecting portion of the one or more leg links.

16. The walking assisting device according to claim 10, wherein the seat member has a constricted portion, which is narrower in width than a backside and a foreside, in a middle of the seat member in a forward and backward direction, with the foreside curved upward.

17. The walking assisting device according to claim 16, wherein the foreside of the seat member is formed in a fork shape with a lateral middle portion cut away.

18. The walking assisting device according to claim 10, wherein the guide track is arc-shaped, wherein the slider includes rollers, and wherein the rollers engage the guide such that the slider rolls along the guide track to facilitate the swinging movement of the one or more leg links in the forward and backward direction.

* * * * *